United States Patent

Stroh et al.

[11] Patent Number: 5,741,027
[45] Date of Patent: Apr. 21, 1998

[54] FRONT STEER AXLE BEAM

[75] Inventors: Clinton Byron Stroh, Portage; Daniel Earl Banks, Climax, both of Mich.

[73] Assignee: Eaton Corporation, Cleveland, Ohio

[21] Appl. No.: 677,519

[22] Filed: Jul. 10, 1996

[51] Int. Cl.$^6$ ................................................. B62D 21/00
[52] U.S. Cl. ........................................ 280/781; 100/905
[58] Field of Search ................................ 280/781, 788; 100/349, 905

[56] References Cited

U.S. PATENT DOCUMENTS

| | | | |
|---|---|---|---|
| 1,888,129 | 11/1932 | Hooper | 180/349 |
| 2,733,933 | 2/1956 | Kishline et al. | 280/781 |
| 3,473,620 | 10/1969 | Müller et al. | 280/788 |
| 4,768,808 | 9/1988 | DeRees | 180/905 |

OTHER PUBLICATIONS

1979 Rockwell Product Brochure.
Truck & Off–Highway Industries, Jul./Aug. 1979, p. 77.
Color photographs of prior art steer axle beam, undated.

Primary Examiner—Kenneth R. Rice
Attorney, Agent, or Firm—Brooks & Kushman P.C.

[57] ABSTRACT

A front steer axle being for use in a motor vehicle to pivotally support a pair of transversely spaced steerable right and left wheel spindle assemblies. The front steer axle beam includes an elongated transverse beam member which is generally symmetrical about a center line. The elongated transverse beam member is formed by a transverse center section having a pair of spaced apart spring mounting pads, a pair of distal ends positioned above the transverse center section for pivotally cooperating with the wheel spindle assemblies, and a pair of S-shaped sections extending between opposed ends of the transverse center section and the spaced apart pair of distal ends. The pair of S-shaped sections have an I-shaped cross-section defined by a single pair of vertically spaced apart flanges and an interconnecting web. Each of the S-shaped sections include a pair of integral reinforcing ribs extending between the spaced apart flanges on opposite sides of the web to strengthen the S-shaped sections, and thereby resisting bending loads resulting from opposed forces exerted on each distal end and its adjacent spring mounting path.

5 Claims, 3 Drawing Sheets

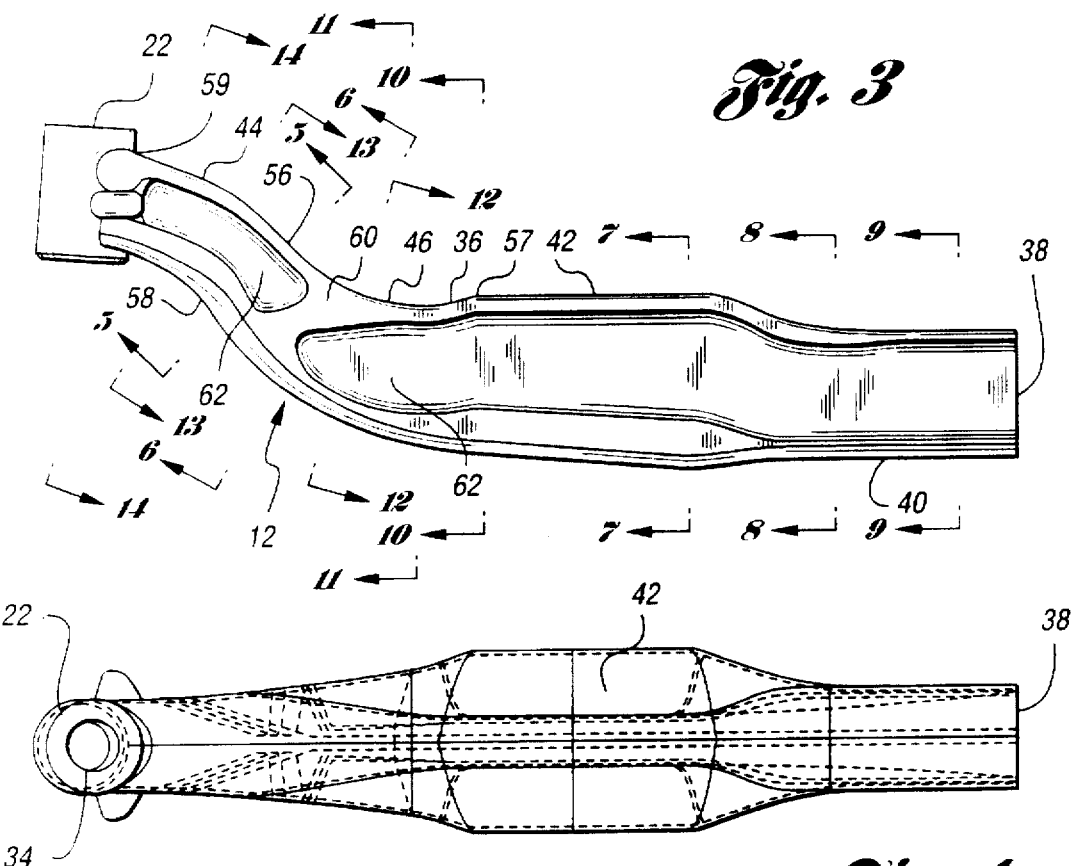
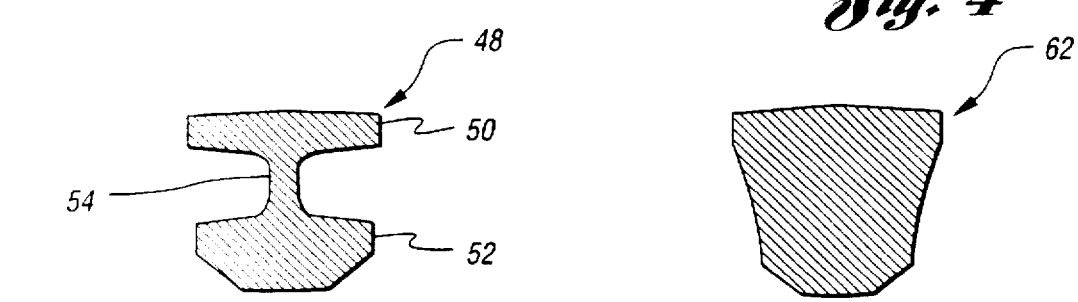
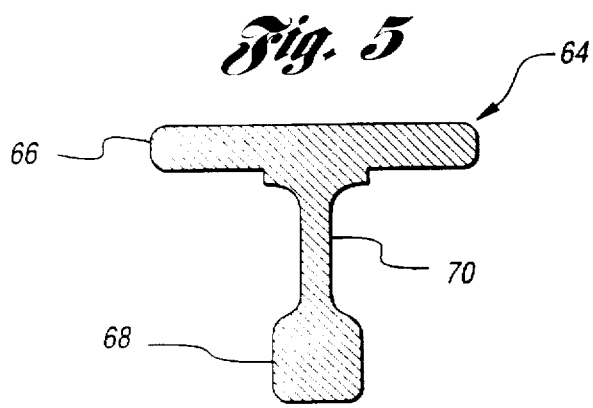
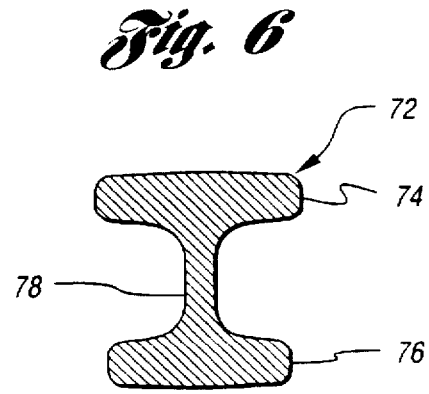

FRONT STEER AXLE BEAM

TECHNICAL FIELD

This invention relates to an improved front steer axle beam in a non-independent suspension arrangement of a vehicle.

BACKGROUND ART

The front suspension arrangement for controlling the front wheels of a vehicle is important for a variety of reasons. The front suspension must control the front wheels in relation to the frame of the vehicle for steering purposes. It must also ensure that the front wheels employ spring action in relation to the frame of the vehicle and other sprung weight components attached to the vehicle frame. Moreover, it must be able to accommodate the front end load of the vehicle. Generally, there exists two forms of front suspension arrangements for use in today's vehicles: the non-independent front suspension system and the independent front suspension system.

The first type of arrangement is the non-independent suspension system. This system is more commonly referred to as the solid steer axle suspension or beam axle steering suspension. In this system, a front steer axle beam and wheel assemblies are connected to the vehicle by shock-absorbers, and front leaf (or plate) springs which are mounted longitudinally over the front steer axle beam. This type of suspension is capable of carrying large loads and is commonly used on commercial vehicles such as medium and heavy duty trucks.

The second type of arrangement, the independent front suspension system, typically operates through the use of heavy-duty coil springs or torsion bars, in conjunction with double-acting shock absorbers. This system allows the front wheels to move up and down independently of each other providing for better handling and a more smooth and comfortable ride. The independent system is most often employed in passenger vehicles and light-duty trucks.

The present invention is particularly applicable to the non-independent suspension arrangement and specifically the front steer axle beam utilized in this arrangement. The front steer axle beam of the non-independent suspension arrangement has historically been forged with various shaped cross-sections, including those having rectangular, tubular and circular cross-sections. Most commonly manufactured, however, is a front steer axle beam having an "I" cross-section forging and suitable spring pads (or seats) for attachment of the springs. These springs act to bear the applied front-end load of the vehicle and deaden ensuing road shock. The front steer axle beam further has wheel spindle assemblies or stub axles suitable to carry the wheels.

The I-shaped cross-section is commonly used for steer axle beams because such shape tends to best withstand the ending action to which the beam is subjected. The ending action arises because the front steer axle beam is supported at its ends, while the applied front-end loads are transmitted at the spring pads situated closer to its center. In a static or unbraked state, this ending action tends to bend the beam in a vertical plane, particularly in the area inboard of the spring pads. While the front steer axle beam in the static state is subjected to some bending action in the horizontal plane (i.e., the plane of vehicle motion), this deflection is small compared to that which occurs in the vertical plane.

However, when the brakes are applied to the front wheels (in the dynamic, or braking state), the bending force on the horizontal plane increases. Such braking action further subjects the area of the front steer axle beam between the wheel spindle assemblies and the spring seats (the gooseneck section or S-shaped section) to a twisting action, as a direct result of the torsion effect from the braking torque applied to the front brake drums.

To overcome this torsion effect, efforts have been made to strengthen the front steer axle beam by increasing the area of its cross-section. Unfortunately, the increase in beam cross-section area is accompanied by an increase in the weight of the beam, as well as the overall unsprung weight of the vehicle. "Unsprung weight" refers to the vehicle body componentry which is not supported by springs, including the wheels, brake systems, differential and axles. Conversely, "sprung weight" involves the use of the aforementioned springs to suspend the vehicle frame, body, engine and powertrain above the wheels.

Because the smoothness of a vehicle's ride increases as its unsprung weight decreases, a low unsprung weight should be a goal of today's vehicle manufacturers and their suppliers. A larger axle beam cross-section thus contributes to a greater unsprung weight, leads to poorer deflection characteristics, and becomes more difficult and expensive to manufacture.

Hence, there exists a need for a lightweight front steer axle beam having improved strength characteristics. Further, the front steer axle beam should provide improved strength during both static loads and applied braking loads to counter the torsional and bending effects on the front steer axle beam. In addition, the front steer axle beam should allow for improved fatigue and endurance strength.

DISCLOSURE OF THE INVENTION

According to the present invention, an improved front steer axle beam is provided for use in a motor vehicle to pivotally support a pair of transversely spaced steerable right and left wheel spindle assemblies. In that regard, the front steer axle beam comprises an elongated transverse beam member generally symmetrical about a center line and formed by a transverse center section having a pair of spaced apart spring mounting pads.

More particularly, according to the present invention, the front steer axle beam further includes a pair of distal ends positioned above the transverse center section for pivotally cooperating with the wheel spindle assemblies, and a pair of S-shaped sections extending between opposed ends of the transverse center section and the spaced apart pair of distal ends.

Still more particularly, the pair of S-shaped sections of the present invention have an I-shaped cross-section defined by a single pair of vertically spaced apart flanges and an interconnecting web, and each of the S-shaped sections include a pair of reinforcing ribs extending between the spaced apart flanges on opposite sides of the web to strengthen the S-shaped sections, thereby resisting the bending loads which result from opposed forces exerted on each distal end and its adjacent spring mounting pad.

Preferably, each of the S-shaped sections of the present invention includes a single pair of integral reinforcing ribs. Further, each of the S-shaped sections comprises a first curved section and a second curved section, the first curved section tangentially blending with the transverse center section at its adjacent spring mounting pad, and the second curved section defining one of the pair of distal ends.

Accordingly, it is the principle object of the present invention to provide an improved front steer axle beam that has improved strength characteristics while being lightweight.

3

Another object of the present invention is to provide an improved front steer axle beam which is able to improve torsional stiffness and withstand the torsional effects of braking loads on the front suspension.

Yet another object of the present invention is to provide an improved front steer axle beam which has an I-shaped cross-section over most of its length.

Still another object of the present invention is to provide an improved front steer axle beam that is able to better resist bending loads resulting from opposed forces exerted on its distal ends and spring mounting pad areas.

These and other objects, features and advantages will be readily apparent upon consideration of the following detailed description of the invention in conjunction with the accompanying drawings.

BRIEF DESCRIPTION OF THE DRAWINGS

FIG. 3 is a front view of a partial front steer axle beam according to the present invention;

FIG. 4 is a top plan view of a partial front steer axle beam according to the present invention;

FIG. 5 is a sectional view of a front steer axle beam according to the present invention taken along line 5—5 as shown in FIG. 3;

FIG. 6 is a sectional view of a front steer axle beam according to the present invention taken along line 6—6 as shown in FIG. 3;

FIG. 7 is a sectional view of a front steer axle beam according to the present invention taken along line 7—7 as shown in FIG. 3;

FIG. 8 is a sectional view of a front steer axle beam according to the present invention taken along line 8—8 as shown in FIG. 3;

BEST MODE CARRYING OUT THE INVENTION

Figure 1:
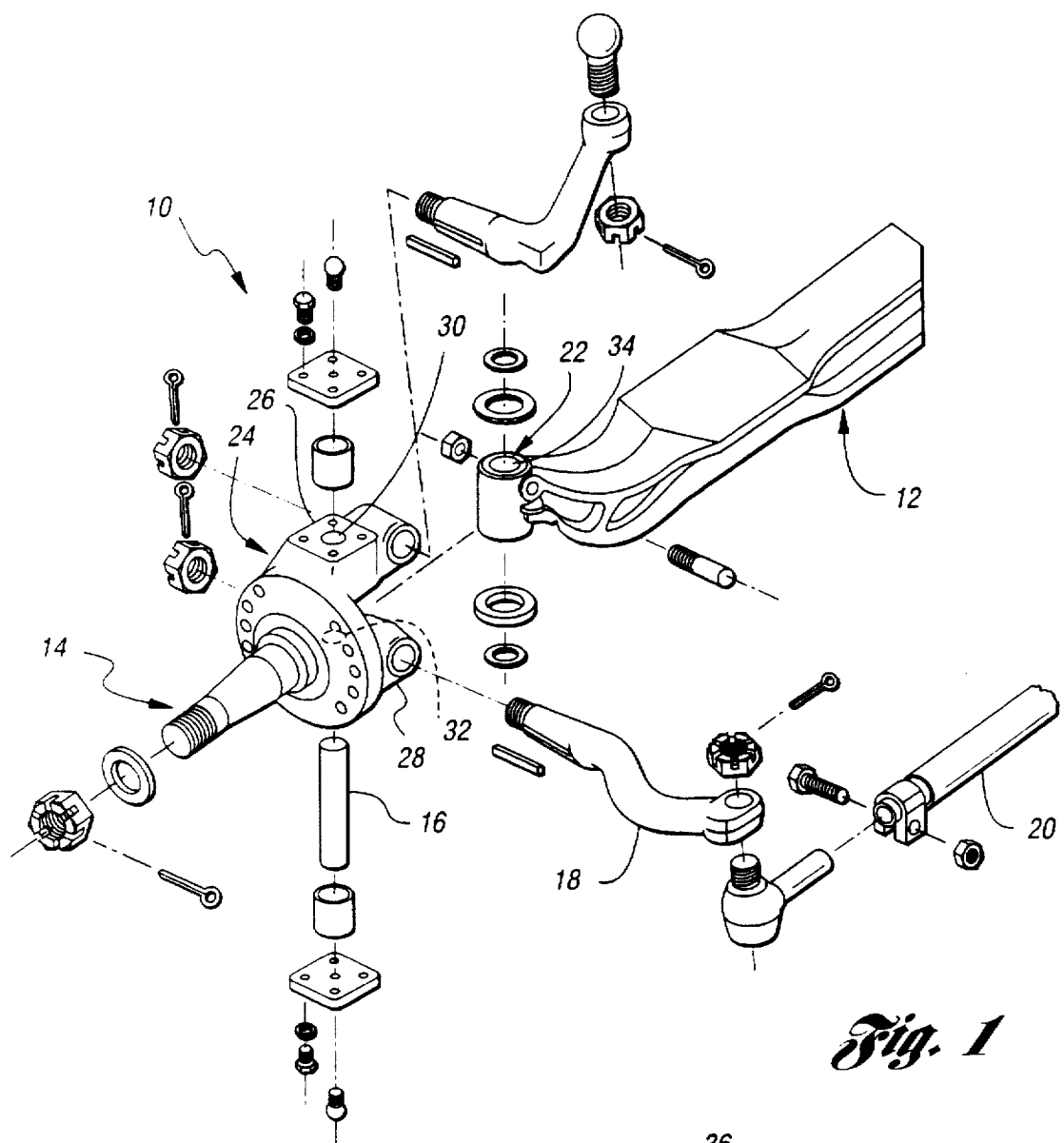
FIG. 1 is a perspective view of the front steer axle beam according to the present invention shown as part of a non-independent suspension arrangement.

Referring first to FIG. 1, an improved front steer axle beam according to the present invention for use in a motor vehicle is shown as part of a non-independent suspension arrangement, denoted generally by reference numeral 10. As shown therein, the arrangement 10, in part, includes front steer axle beam 12, right and left wheel spindle assemblies 14 (only one shown), kingpins 16, tie rod arms 18 and tie rod 20, as well as various bushings, bearings, caps, pins, seals and fasteners (not specifically referred to), as known in the art.

FIG. 1 illustrates one method of assembling the front steer axle beam 12 and wheel spindle assemblies 14 for use in a vehicle. In FIG. 1, front steer axle beam 12 is connected at each distal end 22 to wheel spindle assemblies 14 by means of kingpins 16 (or spindle bolts), thereby providing pivot points for wheel spindle assemblies 14 and to pivotably support them. Each wheel (not shown) is supported on a wheel spindle assembly to permit the front wheels to swing to one side or the other, around kingpin 16. More particularly, wheel spindle assemblies 14 include a knuckle 24 having a first knuckle portion 26 and a second knuckle portion 28, each of the first 26 and second 28 knuckle portions having a first knuckle opening 30 and a second knuckle opening 32, respectively, therethrough. Distal end 22 of front steer axle beam 12 has a pin bore 34 therethrough, distal end 22 being sandwiched or disposed between the first and second knuckle portions 26 and 28, so that first knuckle opening 30, second knuckle opening 32, and pin bore 34 are aligned and co-linear and form a passageway. It is through this passageway that kingpin 16 is inserted in order to fasten wheel spindle assembly 14 to the front steer axle beam 12.

Once inserted and locked in, front steer axle beam 12 is able to pivotably support wheel spindle assembly 14, and is also pivotably connected thereto. However, it is well known in the art that there are various methods, components, and combinations of components that may be used to connect or pivotably support the pair of transversely spaced steerable right and left wheel spindle assemblies 14 relative to the front steer axle beam 12. As such, this connection and support will not be discussed further herein.

Figure 2:
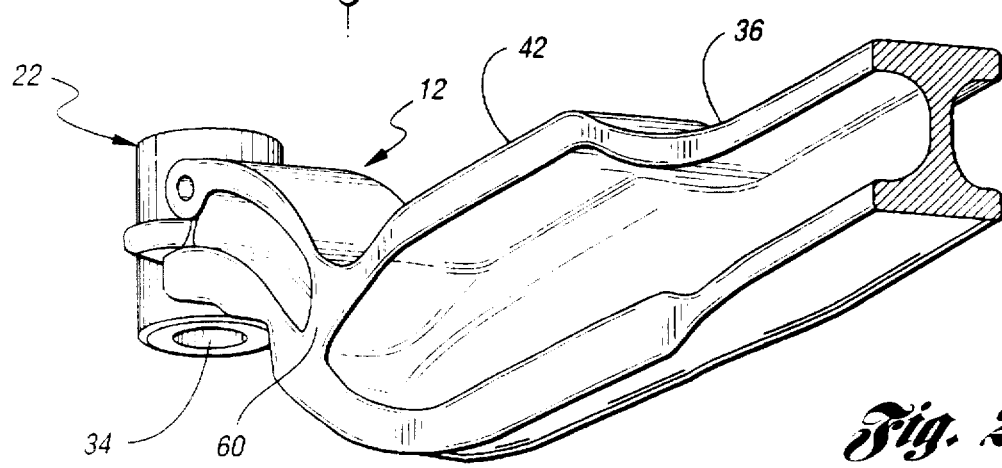
FIG. 2 is a perspective view of a front steer axle beam according to the present invention.

Referring to FIG. 2, the focus of the present invention lies in the construction of front steer axle beam 12 of the non-independent suspension arrangement 10. With reference to FIG. 3 particularly, front steer axle beam 12 includes an elongated transverse beam member 36 that is generally symmetrical about a center line 38. Like components which are symmetrical about center line 38 are given like reference number designations, for ease of illustration and description.

Elongated transverse beam member 36 includes, or is formed by, a transverse center section 40 having a pair of spaced apart spring mounting pads 42. Elongated transverse beam member 36 further has the pair of distal ends 22. Mounted to the top of the axle at each spring mounting pad 42 is a spring (not shown). The springs are typically leaf (or plate) springs of the multi-leaf or single-leaf variety. As shown in FIG. 3, distal ends 22 are positioned or oriented above the transverse center section 40 for pivotally cooperating with or supporting the wheel spindle assemblies 14, as previously discussed above in association with FIG. 1.

The elongated transverse beam member 36 further includes, or is further formed by, a pair of S-shaped sections 44 extending between opposed ends 46 of the transverse center section 40 and the pair of distal ends 22. More particularly, each S-shaped section 44 extends between one opposed end 46 of transverse center section 40 and its adjacent distal end 22. The S-shaped sections 44 may also be referred to or known in the art as "gooseneck" sections. FIG. 4 is a top plan view of FIG. 3, better illustrating the spring mounting pad 42 and related areas.

FIG. 5 illustrates a cross-sectional view of the S-shaped section 44, as taken along line 5—5 of FIG. 3. As shown in FIG. 5, each S-shaped section 44 has an I-shaped cross-section 48 defined by a single pair of vertically spaced apart flanges 50 and 52 and an interconnecting web portion 54. More specifically, the spaced apart flanges may be known as upper flange 50 and lower flange 52. These upper and lower flanges 50 and 52 correspond to upper transverse flange 56 and lower transverse flange 58 in FIG. 3.

Referring again to FIG. 3 and as more fully discussed in association with FIG. 6 below, each of the S-shaped sections 44 includes a pair of reinforcing ribs 60 extending between the spaced apart flanges 56 and 58, located on opposite sides of the transverse web portion 62 to strengthen the S-shaped sections 44. The rib positioning may be characterized as being a diagonally trussed structure in the S-shaped section 44. The strengthened S-shaped sections 44 with integral reinforcing ribs 60 result in improved torsional rigidity and stiffness and are thereby able to resist bending and torsion loads resulting from opposed forces exerted on each distal end 22 and its adjacent spring mounting pad 42.

As shown in FIG. 3, reinforcing ribs 60 preferably connect the lower transverse flange 58 to the area where upper transverse flange 56 meets it adjacent opposed end 46 of transverse center section 40. This is the location where each S-shaped section 44 tangentially blends into its adjacent spring mounting pad 42. The rib 60 positioning may further be defined as being in the central part of S-shaped section 44. (This may be more fully designated as being approximately midway between the outer transition point 57 of spring mounting pad 42 and corner 59 of distal end 22.) However, it is understood by those skilled in the art that the position of reinforcing ribs 60 may be optimized to maximize the strength, durability and torsion/deflection resistance of the front steer axle beam 12, while seeking to keep its weight to a minimum, and that the structure may vary depending on geometry, shape and loads.

Moreover, based on the projections obtained through finite element analysis, it is anticipated that the improved design as disclosed herein will improve the fatigue life of the front steer axle beam 12. However, actual testing has yet to be performed.

FIG. 6 shows a cross-sectional view 62 of S-shaped section 44 through reinforcing ribs 60, as taken along line 6—6 of FIG. 3. This cross-section does not reflect an I-shape because of the reinforcing ribs 60 represented by this section. FIG. 7 illustrates a cross-sectional view through spring mounting pad 42 of transverse center section 40, as taken along line 7—7 of FIG. 3. As shown in FIG. 7, this section is an I-shaped cross-section 64 having an upper mounting flange 66, which defines spring mounting pad 42. I-shaped section 64 further has lower spring pad flange 68, and spring pad web area 70. Note that it is contemplated that the transitions between the various cross-sections involved herein will be smooth transitions, thereby avoiding discontinuities which lead to fatigue failure.

FIG. 8 illustrates a cross-sectional view of elongated transverse beam member 36 and more particularly of transverse center section 40, as taken along line 8—8 of FIG. 3. As shown in FIG. 8, this section is an I-shaped cross-section 72 having an upper center flange 74, a lower center flange 76 and a central web area 78.

Figure 9:
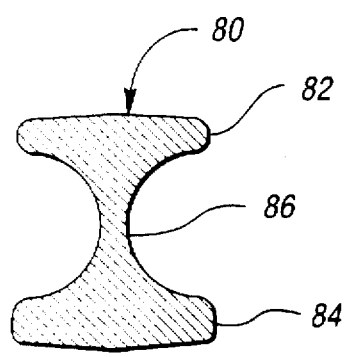
FIG. 9 is a sectional view of a front steer axle beam according to the present invention taken along line 9—9 as shown in FIG. 3.

FIG. 9 further illustrates a cross-sectional view of transverse center section 40, as taken along line 9—9 of FIG. 3. As shown in FIG. 9, this section is an I-shaped cross-section 80 having an upper flange 82, a lower flange 84, and a web area 86.

Figure 10:
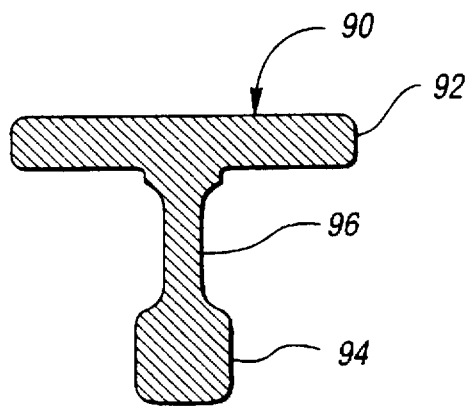
FIG. 10 is a sectional view of a front steer axle beam according to the present invention taken along line 10—10 as shown in FIG. 3.

FIG. 10 reflects a cross-sectional view of spring mounting pad 42 of transverse center section as taken along line 10—10 of FIG. 3. While FIG. 10 is similar to FIG. 7, it is taken closer to the transition point 57 between spring mounting pad 42 and S-shaped section 44. The I-shaped cross-section 90 of FIG. 10 includes upper portion 92, lower portion 94 and web area 96.

Figure 11:
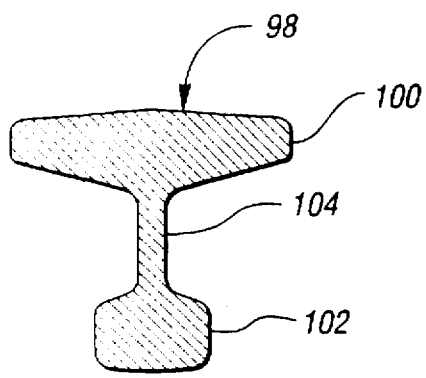
FIG. 11 is a sectional view of a front steer axle beam according to the present invention taken along line 11—11 as shown in FIG. 3.

FIG. 11 is a cross-sectional view of S-shaped section 44 taken along line 11—11 of FIG. 3. FIG. 11 reflects the cross-section of the S-shaped section 44 as it approaches spring mounting pad 42 and transition point 57. FIG. 11 is defined by I-shaped section 98 which includes upper flange 100, lower flange 102 and web area 104.

Figure 12:
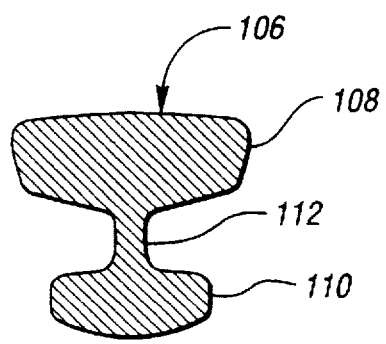
FIG. 12 is a sectional view of a front steer axle beam according to the present invention taken along line 12—12 as shown in FIG. 3.

FIG. 12 is a cross-sectional view of S-shaped section 44 and partially including reinforcing rib 60, as taken along line 12—12 of FIG. 3. FIG. 12 is an I-shaped section 106 defined by a thick upper flange 108 which reflects the incorporated portion of reinforcing rib 60. I-shaped section 106 further includes lower flange 110 and web area 112.

Figure 13:
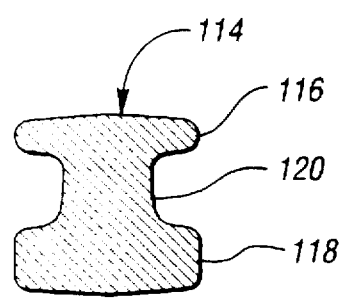
FIG. 13 is a sectional view of a front steer axle beam according to the present invention taken along line 13—13 as shown in FIG. 3.

FIG. 13 is a cross-sectional view of the S-shaped section 44 taken along line 13—13 of FIG. 3. Note that FIG. 13 is defined by I-shaped section 114 which includes an upper flange 116, a lower flange 118, and web area 120.

Figure 14:
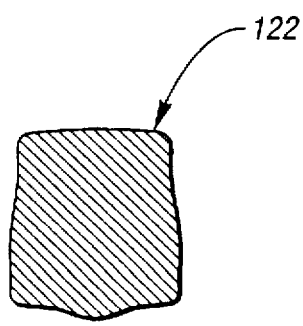
FIG. 14 is a sectional view of a front steer axle beam according to the present invention taken along line 14—14 as shown in FIG. 3.

Thus, except with reference to FIG. 6 and its related description above, the front steer axle beam 12 over its length has an I-shaped cross-section. Note that while the I-shape may be of the classic form like that illustrated in FIG. 8, the I-shape may be also represented by the likes of the cross-sections shown in FIGS. 5, 7 and 13. However, this is by way of example only, and not limitation, as the I-shaped cross-section referred to may be any cross-section wherein two spaced apart flanges are separated by a web portion. Further note that while FIG. 14 does not reflect an I-section, this figure is taken along line 14—14 of FIG. 3 which includes a portion of distal end 22. The cross-section of FIG. 14 is designated as reference numeral 122.

The front steer axle beam 12 of the present invention is preferably a steel forging, but of course may be manufactured in aluminum or any other metal or composite material which would allow the part to achieve the desired properties resulting from the present invention.

The improvements to the front steer axle beam 12 reflected in the present invention discussed herein result in a 20,000-pound load bearing front steer axle beam that is approximately 30 pounds lighter than previous designs not having reinforcing ribs 60 like those disclosed in the present invention. The weight reduction is a result of uniform thinning across the length of the beam due to the addition of reinforcing ribs 60. This lighter beam weight thereby contributes to the overall lower unsprung weight of the vehicle, thus leading to a smoother ride. The improved front steer axle beam 12 of the present invention further has increased strength, fatigue life, improved deflection and torsional resistance characteristics. Conventional finite element analysis was utilized to assist in defining shape and geometry of the beam, and in particular, the rib.

As illustrated in FIG. 6, the cross-sectional view through reinforcing rib 60 is shown as being integral to S-shaped section 44 and is shown as a solid cross-section 62, as would be achieved by a forging or similar process. However, it is contemplated that FIG. 6 may also indicate a hollowed structure wherein reinforcing rib 60 does not connect to the center of the beam (or transverse web portion 62), but wherein one end of rib 60 would connect to the upper transverse flange 56 of S-shaped section 44 and the other end of rib 60 would connect to the lower transverse flange 58 of S-shaped section 44. The center portion of rib 60 would lie as far outward from the center of S-shaped section (or the transverse web portion 62) as structure, load and manufacturing capability permit, thus creating a hollow area between the center portion of rib 60 and transverse web portion 62 on each opposite side of transverse web portion 62. While a forging process may not be feasible to manufacture such a hollow construction, it may potentially be achieved by attaching the rib to the flanges 56 and 58 of S-shaped section 44, by welding, casting or similar processes. It is further contemplated that such a hollow structural design would provide similar load bearing capabilities and strength characteristics as the solid cross-section, such as that shown in FIG. 6.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A front steer axle beam for use in a motor vehicle to pivotally support a pair of transversely spaced steerable right and left wheel spindle assemblies, the front steer axle beam comprising:

an elongated transverse beam member generally symmetrical about a center line and formed by a transverse center section having a pair of spaced apart spring mounting pads, a pair of distal ends positioned above the transverse center section for pivotally cooperating with the wheel spindle assemblies, and a pair of S-shaped sections extending between opposed ends of the transverse center section and the spaced apart pair of distal ends, the pair of S-shaped sections having an I-shaped cross-section defined by a single pair of vertically spaced apart flanges and an interconnecting web, each of the S-shaped sections including a pair of integral reinforcing ribs extending between the spaced apart flanges on opposite sides of the web to strengthen the S-shaped sections, thereby resisting bending loads resulting from opposed forces exerted on each distal end and its adjacent spring mounting pad.

2. The front steer axle beam of claim 1, wherein each of the S-shaped sections includes a single pair of reinforcing ribs.

3. The front steer axle beam of claim 1, wherein each of the S-shaped sections comprises a first curved section and a second curved section, the first curved section tangentially blending with the transverse center section at its adjacent spring mounting pad, and the second curved section defining one of the pair of distal ends.

4. A front steer axle beam for use in a motor vehicle to pivotally support a pair of transversely spaced steerable right and left wheel spindle assemblies, the front steer axle beam comprising:

an elongated transverse beam member generally symmetrical about a center line and formed by a transverse center section having a pair of spaced apart spring mounting pads, a pair of distal ends positioned above the transverse center section for pivotally cooperating with the wheel spindle assemblies, and a pair of S-shaped sections extending between opposed ends of the transverse center section and the spaced apart pair of distal ends, wherein each of the S-shaped sections comprises a first curved section and a second curved section, the first curved section tangentially blending with the transverse center section at its adjacent spring mounting pad, and the second curved section defining one of the pair of distal ends, the pair of S-shaped sections having an I-shaped cross-section defined by a single pair of vertically spaced apart flanges and an interconnecting web, each of the S-shaped sections including a single pair of integral reinforcing ribs extending between the spaced apart flanges on opposite sides of the web to strengthen the S-shaped sections, thereby resisting bending loads resulting from opposed forces exerted on each distal end and its adjacent spring mounting pad.

5. For use in a motor vehicle, a non-independent front suspension system having a tie rod, control arms, and steering arms for suspending the weight of the front of vehicle and for steering control, the non-independent front suspension system comprising:

a front steer axle beam for pivotally supporting a pair of transversely spaced steerable right and left wheel spindle assemblies, the front steer axle beam having elongated transverse beam member generally symmetrical about a center line and formed by a transverse center section having a pair of spaced apart spring mounting pads, a pair of distal ends positioned above the transverse center section for pivotally cooperating with the wheel spindle assemblies, and a pair of S-shaped sections extending between opposed ends of the transverse center section and the spaced apart pair of distal ends, wherein each of the S-shaped sections comprises a first curved section and a second curved section, the first curved section tangentially blending with the transverse center section at its adjacent spring mounting pad, and the second curved section defining one of the pair of distal ends, the pair of S-shaped sections having an I-shaped cross-section defined by a single pair of vertically spaced apart flanges and an interconnecting web, each of the S-shaped sections including a single pair of integral reinforcing ribs extending between the spaced apart flanges on opposite sides of the web to strengthen the S-shaped sections, thereby resisting bending loads resulting from opposed forces exerted on each distal end and its adjacent spring mounting pad, wheel spindle assemblies for pivotably mounting the front steer axle beam to the wheels, the wheel spindle assemblies having a knuckle, the knuckle having a first knuckle portion and a second knuckle portion spaced apart from each other for receiving the distal end of the front steer axle beam, each distal end having a pin bore therethrough, each of the first and second knuckle portions having openings therethrough which are co-linear with each other and with the pin bore of the distal end, for receiving a kingpin for fastening the wheel spindle assembly to the front steer axle beam.

* * * * *